Figure 1:
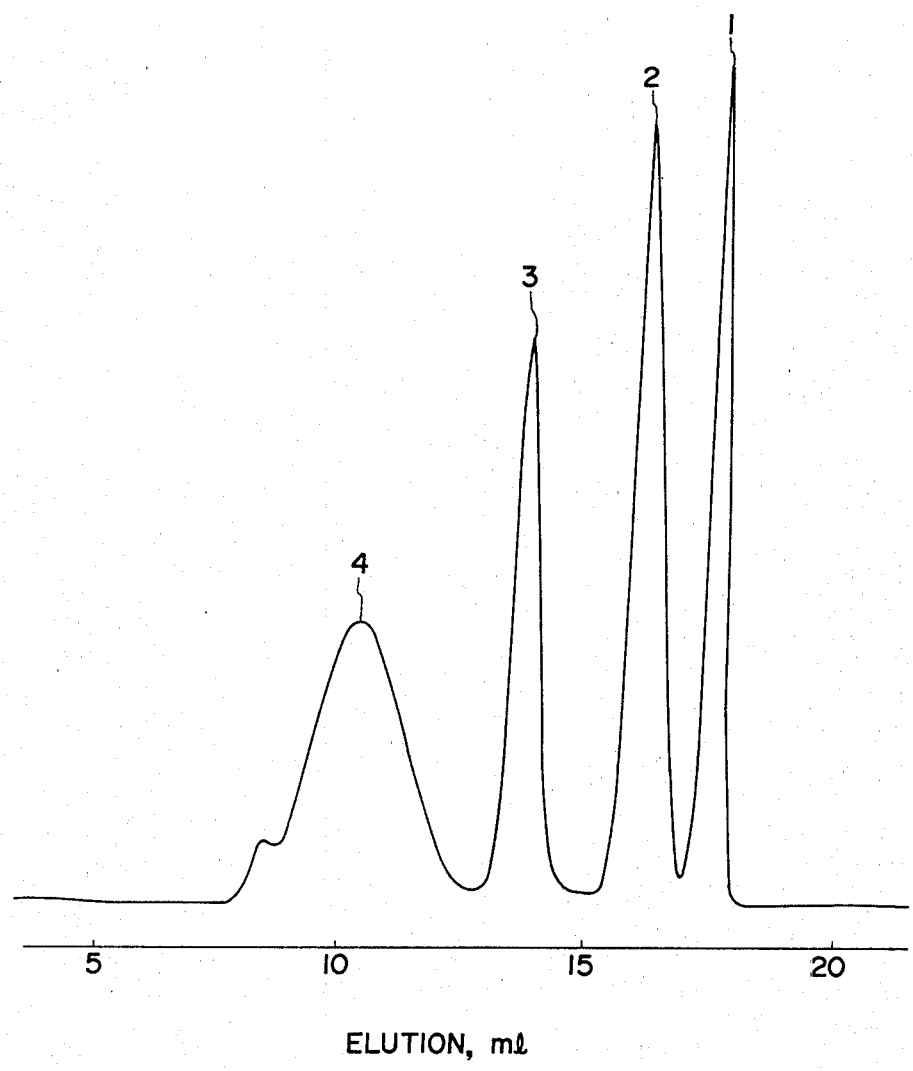

United States Patent [19]

Yanagihara et al.

[11] 4,339,500
[45] Jul. 13, 1982

[54] HYDROPHILIC PACKING MATERIAL FOR CHROMATOGRAPHY

[75] Inventors: Yuzo Yanagihara; Kohji Noguchi, both of Yokohama; Hiroshi Suzuki, Yamato; Makoto Honda, Tokyo, all of Japan

[73] Assignee: Asahi Kasei Kogyo Kabushiki Kaisha, Osaka, Japan

[21] Appl. No.: 196,238

[22] Filed: Oct. 14, 1980

[30] Foreign Application Priority Data

Nov. 1, 1979 [JP] Japan .............................. 54-140421

[51] Int. Cl.$^3$ ...................... B32B 3/00; C08F 226/00
[52] U.S. Cl. .................... 428/402; 521/53; 521/55; 521/905; 525/58; 210/635; 210/198.2
[58] Field of Search .................. 428/402; 521/53, 55; 525/58

[56] References Cited

U.S. PATENT DOCUMENTS 3,002,823 10/1961 Flodin et al.
3,208,994 9/1965 Flodin
3,369,007 2/1968 Flodin .......................... 428/402 X
3,586,626 6/1971 Heitz et al.
3,598,245 10/1969 Determann et al.
4,105,598 8/1978 Yen et al. ........................ 428/402 X Primary Examiner—P. Ives
Attorney, Agent, or Firm—Sprung, Horn, Kramer & Woods

[57] ABSTRACT

Grains of a totally porous, hydroxyl group-containing, nonionic and hydrophilic synthetic cross-linked polymer having alcoholic hydroxyl and ether groups as main hydrophilic groups and having as a main skeleton a chemical structure including carbon atoms, hydrogen atoms and oxygen atoms bonded through single bonds, said synthetic polymer having a hydroxyl group density of 1 to 15 milliequivalents/g, a specific surface area of 5 to 1000 m$^2$/g and a water regain of 0.3 to 3.0 g/g. Such grains have been found to be a packing material or gel for high speed, aqueous gel permeation chromatography. The packing material of the present invention which comprises grains of a hydroxyl group-containing nonionic and hydrophilic synthetic cross-linked polymer has a chemical structure obtained by reacting a totally porous, hydroxyl group-containing, nonionic polymer with a polyfunctional substance capable of reacting with the hydroxyl groups of said polymer while forming cross-linking ether groups.

14 Claims, 1 Drawing Figure

ELUTION, ml

HYDROPHILIC PACKING MATERIAL FOR CHROMATOGRAPHY

The present invention relates to a hydrophilic packing material for chromatography. More particularly, the present invention relates to a totally porous packing material for chromatography which comprises grains of a hydroxyl group-containing nonionic and hydrophilic organic synthetic cross-linked polymer, said grains having, in an aqueous solution of substances to be separated, pore sizes corresponding to the molecular sizes of the substances to be separated and also having a high mechanical strength.

Liquid chromatography conspicuously develops recently because it has become possible to perform the analysis at a high flow rate in a short time by virtue of recent improvement of the mechanical strength of the packing material and successful diminution of the grain size of the packing material. Heretofore, however, as the packing material composed of a nonionic and hydrophilic polymer, there are ordinarily used gels which have a chemical structure of cross-linked dextran or polyacrylamide and hence are very poor in the mechanical strength. Accordingly, in the field of aqueous gel permeation chromatography using mainly these packing materials, the improvement of the operation speed is relatively delayed.

However, since the utility of aqueous gel permeation chromatography (gel permeation chromatography hereinafter is often referred to as "GPC") is very high in the fields associated with biochemistry, the importance of aqueous GPC is increasing and development of a packing material (hereinafter often referred to as "gel") that can be used for high speed aqueous GPC is eagerly desired.

In GPC, a column packed with gels is used, and substances are gradually separated and eluted according to the molecular sizes thereof by the principle that substances having molecular sizes smaller than the size of pores in the gel permeate into the gel according to the molecular sizes thereof while substances having molecular sizes larger than the size of pores in the gel pass through the column without permeation into the gel. In short, GPC is a kind of liquid chromatography. GPC is further classified into an aqueous GPC and an organic solvent GPC according to the kind of solvent to be used.

Organic polymer gels to be used for GPC are classified into soft gels and rigid gels (or semi-rigid gels) according to the mechanical strength of the gel grains (see, for example, Tsuguo Takeuchi and Sadao Mori, "Gel Permeation Chromatography," published by Maruzen K.K. Japan in 1976). In the soft gel, meshes in the network structure formed by cross-linking serve as the pore for GPC and cross-linkages are uniformly distributed throughout the gel. Therefore, the soft gel is also called "uniformly cross-linked gel." The soft gel has a desired pore size when swollen in a solvent, but in the dry state, the soft gel shrinks so that the pores substantially disappear. On the other hand, the rigid gel has a structure in which fine hole portions constituting pores for GPC and dense skeleton portions are distributed entirely in the grain. Therefore, the rigid gel is also called "nonuniformly cross-linked gel" or "totally porous gel." The pore size does substantially not vary whether the gel is in the swollen state or in the dry state.

Gels of organic synthetic polymers used down to the early 1960's were soft gels in either organic solvent GPC or aqueous GPC. In the case of a soft gel, since meshes in the network structure formed by cross-linking serve as pores, the degree of cross-linking should be low to some extent. For this reason, the soft gel is usually poor in mechanical strength and is readily deformed by the pressure of the solvent flowing through the packed column. Accordingly, the soft gel is defective in that it cannot be used for a high-flow-rate analysis. Therefore, GPC using the soft gel is carried out at a low flow rate by using grains having a relatively large size, with the result that a long time is required for analysis and the separation capacity is insufficient.

In 1964, J. C. Moore proposed a gel of a styrene-divinylbenzene skeleton which is more rigid than the conventional gels and can stand a high flow rate in analysis [see J. Polym. Sci., Part A, 2, 835 (1964)]. It was reported there that a gel having an intended pore size can be obtained by suspension-polymerizing a liquid monomer mixture together with an appropriately chosen pore-forming agent. The pore size varies depending on the kind and amount of the pore-forming agent and the amount of the cross-linking agent. However, this gel is different from the soft gel in such a point that the pore size usually increases with increase of the amount of the cross-linking agent. In the so obtained gel, the degree of cross-linking in the portion forming the skeleton is higher than the cross-linking degree in soft gels, and the pores have a strong and firm structure. Therefore, the mechanical strength of such a gel in the wet state is much higher than those of soft gels. This gel is called "rigid gel" in contrast to the soft gel. When the rigid gel is used, since the liquid can be passed at a high rate, the time required for analysis can be shortened. Furthermore, since the grain size can be reduced, the separation capacity can be improved. As is seen from the foregoing illustration, organic solvent GPC has made rapid progress because it has become possible to elevate the liquid flow rate and the separation capacity. However, in the field of aqueous GPC, a gel having a sufficient mechanical strength and a high separation capacity in combination has not been developed. Therefore, development of a gel meeting these requirements has been desired.

As the conventional gel for aqueous GPC, there are known and frequently used gels formed by cross-linking dextran with epichlorohydrin (available under the trade name of "Sephadex," products of Pharmacia Fine Chemicals AB, Sweden). A gel of this type is obtained by cross-linking dextran dissolved in water with epichlorohydrin in the reversed phase suspension system. It is admitted that the properties of the gel are determined by the water regain (hereinafter referred to as "$W_r$") and a gel having a larger $W_R$ value is advantageous (see U.S. Pat. No. 3,208,994). In view of the above preparation process and physical properties, this gel is apparently classified as a soft gel. This is also apparent from the fact that in 1964 J. C. Moore, for the first time, published the rigid gel of the organic polymer type and there had not been present such rigid gel before that time even in the field of organic solvent GPC. More specifically, the pore size of a gel obtained by cross-linking a polymer in the dissolved state is controlled only by the degree of cross-linking and, as pointed out hereinbefore, in this gel, the meshes in the network structure formed by cross-linking constitute pores. Accordingly, when it is desired to cause substances of large molecular weights to permeate in the grains, it is necessary to increase the mesh size by lowering the degree of cross-linking. When the degree of cross-linking is low, the gel is readily swollen in water and the $W_R$ value increases. It is one of the characteristic features of the soft gel that the larger the minimum value of molecular weight not allowed to intrude into the gel grains, that is, the exclusion limit of molecular weight (hereinafter referred to as "Mlim"), the larger the $W_R$ value. Accordingly, this soft gel is still insufficient because the liquid cannot be passed at a high flow rate and hence a long time is required for analysis.

According to experiments shown in Japanese Patent Application Publication No. 21405/1972 (corresponding to U.S. Pat. No. 3,208,994), when this soft gel is used for the removal of a substance having a very low molecular weight, such as sodium chloride, from a liquid, analysis is completed in a relatively short time, but in the case of analysis of proteins in bovine serum, the sample is passed at a flow rate of 30 ml/hr through a packed layer having a volume of 450 ml by using a gel having a $W_R$ value of 20 g/g and a grain size of 140 to 400 mesh. In short, in the case of high-molecular-weight substances such as proteins, about 15 hours are required for completion of the analysis. On the other hand, in organic solvent GPC using a styrene type rigid gel, this analysis is completed within 20 to 30 minutes, 1 hour at longest. In view of this fact, it is seen that the time of the above-mentioned analysis by the aqueous GPC is extremely long as compared with that in the analysis by the organic solvent GPC.

Also is known an aqueous gel obtained by saponifying grains of a copolymer of vinyl acetate with 1,4-butanediol divinyl ether (see U.S. Pat. No. 3,586,626). However, as admitted by Mr. W. Heitz, the inventor of this U.S. Patent, since this gel is defective in that the copolymerizability of the monomers used for copolymerization is low [see W. Heitz, J. Chromatogr., 53, 37 (1970)], the formed gel fails to have a sufficient mechanical strength and cannot practically be used for high-speed GPC.

It has been reported that an aqueous gel having a high mechanical strength can be obtained by saponifying grains of a copolymer of diethylene glycol dimethacrylate or glycidyl methacrylate with vinyl acetate and cross-linking the saponified copolymer with epichlorohydrin (see U.S. Pat. No. 4,104,208). However, the gel obtained by this method is not preferred because there are present, in the skeleton, functional groups which are readily hydrolyzed in the presence of an acid or base or which exert an adsorbing action on some substances to be separated, such as ester groups or carboxyl groups.

Further, there have been proposed gels of inorganic compounds such as silica have a high mechanical strength, but since they exert an adsorbing action in an aqueous solution to substances to be separated, they are not suitably used for aqueous GPC.

It is therefore a primary object of the present invention to provide a gel for high-speed aqueous GPC free of the defects inevitably accompanying the above-mentioned conventional packing materials for aqueous chromatography, which has not carboxyl or ester groups but alcoholic hydroxyl and ether groups as main hydrophilic groups, has a microporous structure suitable for GPC and also has a sufficiently high mechanical strength.

Essentially, in accordance with the present invention, there is provided a totally porous, hydrophilic packing material for chromatography which comprises grains of a hydroxyl group-containing nonionic and hydrophilic synthetic cross-linked polymer having as a main skeleton a chemical structure including carbon atoms, hydrogen atoms and oxygen atoms bonded through single bonds, said synthetic polymer having a hydroxyl group density of 1 to 15 milliequivalents/g, a specific surface area of 5 to 1000 m$^2$/g and a water regain of 0.3 to 3.0 g/g. The packing material or gel of the present invention has no substantial adsorbing action to water-soluble synthetic polymers, polysaccharides, proteins and the like.

By the hydroxyl group-containing nonionic and hydrophilic synthetic cross-linked polymer having as a main skeleton a chemical structure including carbon atoms, hydrogen atoms and oxygen atoms bonded through single bonds, that is used in the present invention, is meant a synthetic polymer having a main skeleton including hydroxyl groups, ether groups, carbon-hydrogen bonds and carbon-carbon single bonds. Oxygen-oxygen bonds and unstable groups such as 3- or 4-membered rings consisting of carbon and oxygen atoms should substantially not be contained in the synthetic polymer that is used in the present invention.

The gel is rendered hydrophilic by the presence of hydroxyl groups and ether groups. The density of the hydroxyl groups (hereinafter referred to as "$q_{OH}$") is very important, and this density should be within the range of from 1 to 15 milliequivalents/g (hereinafter referred to simply as "meq/g"). If the $q_{OH}$ value exceeds the upper limit, the mechanical strength of the gel is reduced, and if the $q_{OH}$ value is smaller than the lower limit, the hydrophilic characteristic of the gel is lost but the adsorbing property comes out. From the practical viewpoint, it is preferred that the $q_{OH}$ value of the gel be 2 to 12 meq/g. Incidentally, the $q_{OH}$ value can be determined by reacting the gel with acetic anhydride in a pyridine solvent, measuring the amount of acetic anhydride consumed for the reaction with the hydroxyl groups and calculating the concentration of the hydroxyl groups from this measured value. For example, when 1 millimole of acetic anhydride is consumed for the reaction with 1 g of a dry gel, the $q_{OH}$ value of this gel is 1 meq/g.

As pointed out hereinbefore, the gel of the present invention has a main skeleton including hydroxyl groups, ether groups, carbon-hydrogen bonds and carbon-carbon single bonds. This skeleton may further include other atoms and/or chemical structures, such as atoms and/or chemical structures introduced into the skeleton by the polymerization initiator during the gel preparation process and/or chemical structures formed by side reactions during the gel preparation process, so far as the essential characteristics of the gel are not changed by the presence of these other atoms and/or chemical structures. However, it is generally preferred that the amount of atoms and/or chemical structures other than the above-mentioned main skeleton be not more than 3% by weight based on the dry gel. In other words, it is preferred that said chemical structure including carbon atoms, hydrogen atoms and oxygen atoms bonded through single bonds is present in an amount of 97% or more by weight based on the entire skeleton of the dry gel, that is, the synthetic cross-linked polymer. When the gel of the present invention is different in chemical structure from the mentioned above, there often occurs an undesirable phenomenon of adsorption of separated substances on the gel when GPC is carried out.

The packing material of the present invention which comprises grains of a hydroxyl group-containing nonionic and hydrophilic synthetic cross-linked polymer has a chemical structure obtained by reacting a totally porous, hydroxyl group-containing, nonionic polymer having a specific surface area of not more than 1 m$^2$/g as measured upon drying the polymer which has been immersed or dissolved in water and a hydroxyl group density of 5 to 23 milliequivalents/g with a polyfunctional substance as a cross-linking agent in such a solvent as will not dissolve or swell polyvinyl alcohol, said polyfunctional substance being capable of reacting with the hydroxyl groups of said polymer while forming cross-linking ether groups.

By the totally porous, hydroxyl group-containing, nonionic polymer having a specific surface area of not more than 1 m$^2$/g as measured upon drying the polymer which has been immersed or dissolved in water and a hydroxyl group density of 5 to 23 milliequivalents/g is meant a totally porous polymer containing at least vinyl alcohol units and/or allyl alcohol units. For example, there can be mentioned linear polymers such as polyvinyl alcohol, a polyallyl alcohol, a copollymer of vinyl alcohol with allyl alchol, and polymers having a chemical structure obtained by saponifying a copolymer of a monomer having at least one carboxylic acid vinyl ester group and/or a monomer having at least one carboxylic acid allyl ester group with a polyvinyl monomer having an ether group such as 1,4-butanediol divinyl ether, diethylene glycol divinyl ether or diethylene glycol diallyl ether. The molecular weight of the polymer to be used is not critical. With respect to the linear polymers, however, there may preferably be used those having a weight average molecular weight of $5 \times 10^3$ to $2 \times 10^5$ as measured by Ostwald's viscosity method. With respect to the copolymers having cross-linkages, the molecular weight thereof cannot be measured but it does not matter. These polymers should have a totally porous structure. By the totally porous structure is meant a structure in which fine pores are distributed throughout the grain of polymer and the specific surface area is at least 5 m$^2$/g in the dry state of the grain. However, the above-mentioned polymers are not cross-linked or are low in substantial cross-linking degree. Therefore, when they are immersed or dissolved in water and then dried, the fine pores substantially disappear, thus causing the specific surface area of the polymer to be less than 1 m$^2$/g. For this reason, these polymers must not be contacted with water prior to measurement of a specific surface area thereof or prior to being subjected to the reaction with the cross-linking agent.

As the polyfunctional substance capable of reacting with hydroxyl groups to form cross-linking ether groups, there can be mentioned, for example, epihalohydrin compounds such as epichlorohydrin and epibromohydrin, compounds having at least two epoxy groups such as ethylene glycol diglycidyl ether, propylene glycol diglycidyl ether and trimethylolpropane triglycidyl ether, and compounds having at least two aldehyde groups such as glyoxal and glutaraldehyde. In the present invention, a cross-linking acetal group is included in the cross-linking ether group.

The constituent elements of the gel of the present invention can be determined by the elementary analysis, and the chemical structures can be determined mainly by the infrared absorption spectrum analysis. When the presence of functional groups other than the main chemical structures of the present invention is found by the infrared absorption spectrum analysis, the functional groups are quantitatively determined by chemical analysis or polarographical analysis, and thus, whether or not the gel has chemical structures included in the scope of the present invention can be determined.

As described hereinbefore, the gel of the present invention should have a specific surface area of 5 to 1000 m$^2$/g in the dry state. This specific surface area is closely related to the structure of the gel. Usually, an organic synthetic polymer having a cross-linking structure swells in a solvent having an affinity for the polymer but shrinks when dried. In the case of a soft gel in which pores filled with the solvent in the swollen state are maintained only by the meshes of the network of the cross-linkage, when the gel is dried, the expanded state cannot be maintained in the meshes and they are broken. In this case, the specific surface area is generally as small as 1 m$^2$/g or less because the value of the specific surface area is only that of the outer portion of the grain. On the other hand, in the case of a rigid gel having a firm pore structure, pores shrink to some extent when the gel is dried but the state at the time when the gel is swollen is substantially maintained. Accordingly, since fine pores are retained in the interior of the grain, the specific surface area is much larger than that of the soft gel. In the gel of the present invention, even if the Mlim value is large, since the pores have a firm structure, the specific surface area is large in the dry state. The value of the specific surface area smaller than 5 m$^2$/g indicates that the gel has a uniformly cross-linked structure (soft gel) which hardly has fine pores, and such a gel is not preferred for high-speed GPC. In order to employ the gel of the present invention as the packing material for a high-speed GPC requiring the gel to have a practically sufficient mechanical strength and separation capacity, it is preferred that the gel have a specific surface area of 10 to 500 m$^2$/g.

There are known various methods for the determination of specific surface area. In the present invention, the specific surface area is determined according to the most popular BET method using nitrogen gas. The sample to be used for the determination of specific surface area should be sufficiently dried. The gel of the present invention is high in degree of cross-linking and has a firm porous structure, and hence, even if the gel is immersed in water and then dried, it retains the same specific surface area as that of the polymer prior to the above procedures, that is, immersion in water and the subsequent drying. However, since it is difficult to dry the gel of the present invention because of a high hydrophilic characteristic, in order to determine the specific surface area, it is preferred that the gel be first equilibrated with acetone and then dried under reduced pressure at a temperature lower than 60° C.

As described before, the water regain $W_R$ of the gel of the present invention should be in the range of from 0.3 to 3.0 g/g. The $W_R$ value is the amount of water that can be contained in the pores of the gel when the gel is equilibrated with water, per unit weight of the gel in the dry state. In short, the $W_R$ value can be a criterion indicating the quantity of pores participating in GPC. As the $W_R$ value is increased, the weight of the skeleton-constituting portion of the gel in water, namely, the weight of the gel per se, is relatively decreased. Accordingly, if the $W_R$ value is too large, the mechanical strength of the gel is reduced in water, and therefore, it is impossible to elevate the flow rate and the pressure loss in the packed column is increased. If the $W_R$ value is too small, since the quantity of pores in the grains, which pores participiate in GPC, is reduced, the separating capacity of the gel is lowered. Therefore, from the viewpoint of the physical properties of the gel for high-speed GPC, it is very important that the $W_R$ value should be within the above-defined range.

In the conventional soft gel having a chemical structure similar to that of the gel of the present invention, increase of the Mlim value should naturally result in increase of the $W_R$ value and reduction of the mechanical strength. As explained before, in the soft gel, since in order to increase the Mlim value, it is necessary to reduce the degree of cross-linking for expanding the mesh spacings, the $W_R$ value is inevitably increased with the reduction of mechanical strength. In contrast, in the gel of the present invention, the $W_R$ value is in the range of from 0.3 to 3.0 g/g irrespectively of the Mlim value, and even a gel having a large Mlim value can be used for high-speed GPC. This is an epoch-making property for gels for high-speed aqueous GPC. The $W_R$ value can be determined by subjecting a gel sufficiently equilibrated with distilled water to centrifugation to remove the water adhering to the surface of the gel, measuring the weight ($W_1$) of the gel, drying the gel, measuring the weight ($W_2$) of the gel after drying and calculating the $W_R$ value according to the following formula:

$$W_R = (W_1 - W_2)/W_2$$

In the gel of the present invention, the Mlim value may vary within a broad range. As described before, the Mlim value indicates the lower limit of the molecular weight of a molecule which cannot permeate into the pores of the gel. Substances having a molecular weight lower than this critical value can be separated by GPC, but substances having molecular weights higher than this critical value cannot permeate into the pores of the gel but pass directly through clearances among the grains. Accordingly, the latter substances show substantially the same elution rate irrespectively of the molecular weight and, hence, these substances cannot be separated. The Mlim value can be obtained from the calibration curve of GPC. The calibration curve can be obtained by plotting measurement data of samples having known molecular weight on a graph in which the elution capacity of a gel-packed column is shown on the abscissa and the logarithm of the molecular weight is shown on the ordinate, and this calibration curve comprises a line substantially parallel to the ordinate and a subsequent line of a negative gradient.

In determination of the Mlim value in the present invention, polyethylene glycol or dextran is used as the reference substance having a known molecular weight and distilled water is used as the solvent, and the value of the ordinate at the point where the extension of the line parallel to the ordinate of the so obtained calibration curve intersects the extension of the inclined line is read and the read value is designated as the Mlim value. Incidentally, since commercially available water-soluble standard polymers have a molecular weight lower than 2,000,000, a complete calibration curve cannot be obtained with respect to a gel having an Mlim value exceeding 2,000,000. Therefore, the Mlim value of such gel cannot precisely be determined, but the Mlim value is estimated from the intersecting point where the extension of the calibration curve determined with respect to molecular weights lower than 2,000,000 intersects the extension of the line parallel to the ordinate, which is determined under the same conditions with respect to a gel having a smaller Mlim value. The Mlim value of the gel of the present invention is generally larger than $10^3$, but the gel having an Mlim value of from $10^4$ to $10^8$ performs efficiently in practicing GPC and therefore is preferred.

The average grain size (hereinafter referred to as "$\overline{D}_w$") of the gel of the present invention is generally 1 to 2,000 μm and preferably 2 to 500 μm. When the gel is used for high-speed GPC, it is especially preferred that the $\overline{D}_w$ value be in the range of from 2 to 50 μm. In the case of small grains, the $\overline{D}_w$ value is determined by "Coulter Counter" (trade name of an apparatus manufactured by Coulter Electronics Inc., U.S.A.), and in the case of large grains, the $\overline{D}_w$ value is calculated according to the following formula by measuring the frequency n of occurrence of the grain size d by using a microscope or sieve:

$$\overline{D}_W = (\Sigma n d^4 / \Sigma n d^3)$$

The gel of the present invention has such a characteristic property that even if the Mlim value is large, the $W_R$ value is appropriately small and the specific surface area is large in the dry state. From this characteristic property, it is apparent that the gel of the present invention is a rigid gel having so-called permanent pores in which the change in structure of the pores is very small when the swollen gel is dried. Accordingly, the gel of the present invention has a higher mechanical strength than the soft gel irrespectively of the Mlim value, and can be reduced in grain size. Even when a column is packed with the fine grains of the present invention, the solvent can be passed through the packed column at a high flow rate. Ordinarily in chromatography, the separation capacity is improved according to reduction of the grain size of the packing material. With respect to the gel of the present invention, the separation capacity can be improved by reducing the grain size, and since the liquid can be passed at a high flow rate, there can be attained an effect of remarkably shortening the analysis time. When a conventional cross-linked dextran gel is used, several hours or more than 10 hours in some case are required for ordinary analysis. In contrast, when the gel of the present invention is used, analysis is completed within 20 to 30 minutes or within about 1 hour at longest. Furthermore, in the gel of the present invention, since the degree of cross-linking in the skeleton portion is higher than the cross-linking degree of the soft gel and, in addition, functional groups which are readily hydrolyzed, such as ester groups, are not contained, the chemical resistance is very high. An aqueous solution of an acid or alkali is often used as the solvent in aqueous GPC. Accordingly, a high chemical resistance can broaden the selection range of solvents usable for aqueous GPC. Moreover, since the gel of the present invention comprises a hydroxyl group-containing nonionic and hydrophilic synthetic cross-linked polymer having as a main skeleton a chemical structure including carbon atoms, hydrogen atoms and oxygen atoms bonded through single bonds, the gel of the present invention has no adsorbing capacity for substantially all of water-soluble substances. Accordingly, in separation and analysis of water-soluble polymers, saccharides and proteins, the relation between the elution volume and the logarithm of the molecular weight is shown by a calibration curve which is substantially linear or smoothly curved. Still further, in the gel of the present invention, the pore size of the gel can be controlled according to the molecular weight of the substance to be separated. Such excellent totally porous rigid gel comprising an organic synthetic polymer as the skeleton, which has no adsorbing property in an aqueous solution, includes controlled fine pores and also has a sufficiently high chemical resistance, can be provided for the first time according to the present invention.

The FIGURE of the accompany drawing shows elution curves obtained by separation test conducted with respect to an aqueous mixture of ethylene glycol, two kinds of propylene glycols and dextran using the present gels for aqueous GPC in Example 1.

Now, a preferred instance of the process for the preparation of the gel of the present invention will be described. Of course, the process for the preparation of the gel of the present invention is by no means limited to the process described below.

First, totally porous polymer grains having a three-dimensional cross-linked structure are prepared by subjecting to suspension-polymerization in water a uniform liquid mixture comprising 100 parts by weight of a monomer containing at least a divinyl ester of a dicarboxylic acid, 50 to 250 parts by weight of an inert organic solvent for controlling the fine pore size and 0.1 to 5 parts by weight of a radical polymerization initiator. When the grains so obtained are subjected to ester exchange reaction or saponification reaction in such a solvent as will not dissolve or swell polyvinyl alcohol, grains of a totally porous polymer having therein vinyl alcohol units as main structural units are obtained. Then, the grains thus obtained are reacted with a polyfunctional substance capable of reacting with hydroxyl groups to form cross-linking ether groups, such as an epihalohydrin compound, a diepoxy compound or a dialdehyde compound, in such a solvent as will not dissolve or swell polyvinyl alcohol, whereby the gel of the present invention is obtained.

As the divinyl ester of the dicarboxylic acid to be used for the preparation of the gel of the present invention, there can be mentioned, for example, divinyl succinate, divinyl glutarate, divinyl adipate, divinyl sebacate and divinyl phthalate. These divinyl esters of dicarboxylic acid may be used in combination with a vinyl ester of a monocarboxylic acid such as vinyl acetate, a diallyl ester of a dicarboxylic acid such as diallyl phthalate or a polyvinyl compound having an ether group, such as diethylene glycol divinyl ether, diethylene glycol diallyl ether and 1,4-butanediol divinyl ether. In order to obtain totally porous grains having fine pores with controlled pore size by suspension polymerization, it is important that a divinyl ester of a dicarboxylic acid should be contained in the monomer liquid to be polymerized in an amount of at least 10% by weight, preferably at least 20% by weight. When a monomer liquid comprising vinyl acetate as the main component and containing the divinyl ester of dicarboxylic acid in an amount smaller than 10% by weight is used as the starting material for the preparation of the gel, even if suspension polymerization is carried out in water by using the above-mentioned inert organic solvent and radical polymerization initiator, totally porous polymer grains having a three-dimensional cross-linked structure cannot be obtained. Therefore, even if the so obtained grains are subjected to subsequent reactions for the preparation of a gel, a totally porous gel cannot be obtained at all.

Furthermore, even when totally porous polymer grains are obtained by suspension-polymerizing a divinyl ester of a dicarboxylic acid and 1,4-butanediol divinyl ether in water in the presence of the above-mentioned inert organic solvent and saponifying the resulting totally porous polymer grains under such a solvent as will not dissolve polyvinyl alcohol, in so far as they are directly used as the gel without being subjected to cross-linking reaction, the gel is insufficient in mechanical strength and, hence, is not suitable for high-speed GPC.

As the inert solvent for controlling the fine pore size, there may advantageously be employed such a solvent as will dissolve the monomer but will be hardly soluble in water, for example, ethyl acetate, n-butyl acetate, butanol, heptanol or octane. For further controlling the fine pore size, there may be employed a linear polymer, such as polystyrene, polyvinyl acetate or the like, in combination with the inert organic solvent. Such a linear polymer may preferably have a weight average molecular weight of $10^4$ to $10^6$, and may be employed in an amount of 10 parts by weight or less per 100 parts by weight of the monomer.

Examples of the radical polymerization initiator include those which are ordinarily employed, namely, azo type polymerization initiators such as 2,2'-azobisisobutyronitrile, 2,2'-azobis (2,4-dimethylvaleronitrile) and the like, and peroxide type polymerization initiators such as benzoyl peroxide, lauroyl peroxide and the like.

The suspension-polymerization reaction may generally be carried out at temperatures of 60° to 90° C.

The desired grain size can be obtained by agitating the liquid at a suitable speed before heating so that the sizes of the oil droplets are controlled to the desired grain size.

The ester-exchange reaction of the grains obtained by the polymerization or the saponification of the grains with an acid or an alkali is effected in such a solvent as will not dissolve or swell polyvinyl alcohol at a temperature below the boiling point of the solvent. As examples of the solvent in which polyvinyl alcohol is hardly soluble, there can be mentioned lower alcohols such as methanol and ethanol, and a mixture of acetone and a lower alcohol. When the saponification reaction of the grains obtained by the polymerization is effected in such a solvent as will easily dissolve polyvinyl alcohol, for example, in water, the formed polymer having vinyl alcohol monomer units as main structure-constituting units cannot retain a spherical shape thereof but is easily dissolved or extremely swollen to lose the finely porous structure formed at the time of polymerization, and therefore, the desired gel cannot be obtained.

For the same reason as described above with respect to the saponification reaction of the grains obtained by the polymerization, the reaction of the polymer obtained by the saponification or ester-exchange reaction with a polyfunctional substance capable of reacting with the hydroxyl groups of said polymer while forming cross-linking ether groups should be conducted in such a solvent as will not dissolve or swell polyvinyl alcohol. As examples of the solvent, there can be mentioned diethyl ether, dibutyl ether, chloroform, carbon tetrachloride, 1,2-dichloroethane, acetone and a mixture of acetone and dimethyl sulfoxide. The amount of the polyfunctional substance to be added is varied according to the desired properties of the gel and the kind of the polymer, but it is preferred that the amount of the polyfunctional substance be 10 to 600% by weight, especially 20 to 400% by weight, based on the polymer, with which the polyfunctional substance is to be reacted. The reaction may preferably be carried out in the presence of an acid catalyst such as boron trifluoride ethyl etherate, sulfuric acid or the like or an alkaline catalyst such as sodium hydroxide or potassium hydroxide or the like at a temperature below the boiling point of the solvent used.

According to the aforementioned conventional method of U.S. Pat. No. 3,208,994, dextran or polyvinyl alcohol dissolved in water is suspended in a water-insoluble solvent and reacted with epichlorohydrin. The gel of the present invention cannot be obtained by cross-linking polyvinyl alcohol or the like forming the skeleton of the gel in the state dissolved in water as in such a conventional method. In other words, in the present invention, it is important that grains of a totally porous polymer having a chemical structure convertible to a polymer having therein vinyl alcohol units as the main structure-constituting units by saponification and also having fine pores with controlled pore size should be prepared by suspension polymerization and the so obtained grains should be subjected to ester exchange reaction or saponification reaction and subsequent cross-linking reaction under conditions capable of substantially maintaining the fine pore structure in the grains.

The present invention will now be described with reference to the following Examples.

EXAMPLE 1

A liquid mixture of 80 g of divinyl adipate (having a purity higher than 99%), 200 g of n-butyl acetate and 1 g of 2,2'-azobisisobutyronitrile was charged into a cylindrical flask having a capacity of 2 liters together with 1.2 liter of water containing a suspension stabilizer, and the mixture was stirred for 1 hour. Then, the flask was heated at 70° C. on a water bath to effect suspension polymerization for 20 hours. After completion of the polymerization, formed grains were recovered by filtration, washed with water and then with methanol and dried. The grains were charged in a round-bottom flask having a capacity of 2 liters together with 1 liter of methanol containing 32 g of sodium hydroxide, and the mixture was heated under agitation at 40° C. for 24 hours. After completion of the reaction, the resulting grains were recovered by filtration and washed with methanol and then with acetone. A small amount of the grains was dried and used for infrared absorption spectrum analysis and determination of the specific surface area, and the remaining majority of the grains were used for the reaction with epichlorohydrin. In the infrared absorption spectrum, an absorption inherent of the ester group of divinyl adipate used for the polymerization was not observed at all. The specific surface area was 180 m$^2$/g as determined according to the BET method using nitrogen gas. From these measurement results, it was confirmed that the grains obtained by the ester exchange reaction were composed of totally porous polyvinyl alcohol.

The reaction of the grains with epichlorohydrin was carried out in the following manner.

The polyvinyl alcohol grains were charged in a round-bottom flask together with a liquid mixture comprising 350 ml of dimethyl sulfoxide, 350 ml of acetone, 37 g of epichlorohydrin and 16 g of sodium hydroxide, and the mixture was heated under agitation at 50° C. for 24 hours. After completion of the reaction, the grains were recovered by filtration and sufficiently washed with hot water and then with acetone. Then, the grains were mixed with a freshly prepared, epichlorohydrin-containing liquid mixture having the same composition as described above, and the mixture was heated under agitation at 50° C. for 24 hours. These filtration, washing and reaction operations were further repeated once more in the same manner as described above.

The resulting grains were heated at 80° C. for 24 hours under agitation together with a 1 N aqueous solution of sodium hydroxide, and the grains were sufficiently washed with water and dispersed in water. Simple classification utilizing the difference of the sedimentation speed was carried out several times. The average size of the so obtained grains was determined by using "Coulter Counter Model ZB" (trade name of an apparatus manufactured and sold by Coulter Electronics Inc., U.S.A.). It was found that the average grain size was 13.5 μm. The $W_R$ value was 1.90 g/g as determined according to the method described before. A part of the obtained gels was reacted with acetic anhydride at 90° C. in a pyridine solvent and when the OH group density ($q_{OH}$) in the gel was calculated from the amount of reacted acetic anhydride, it was found that the $q_{OH}$ value was 8.7 meq/g. The specific surface area of the gel in the dry state was 70 m$^2$/g.

The gels so obtained were packed in a stainless steel column of 7.5 mm in inner diameter and 50 mm in length, and an aqueous solution of various dextrans and polyethylene glycols differing in molecular weight was passed through the column. It was found that the substance having a higher molecular weight was first eluted. When the obtained data were plotted on a graph in which the logarithm of the molecular weight and the elution volume were shown on the ordinate and abscissa, respectively, a smooth curve having a negative gradient was obtained. The exclusion limit of molecular weight (Mlim) obtained from this calibration curve was about $2.5 \times 10^5$. The measurement was carried out at a flow rate of 1 ml/min, and analysis was completed within 20 minutes even in the case of the substance having a lower molecular weight. A sample of a mixed aqueous solution containing (1) ethylene glycol (2) polyethylene glycol (weight average molecular weight=300), (3) polyethylene glycol (weight average molecular weight=4,000) and (4) dextran (weight average molecular weight=70,000) was analyzed at a flow rate of 1 ml/min by using the above-mentioned packed column. As is seen from the chart of FIG. 1, the substances could be separated very well. This chart was obtained within 20 minutes. In view of the fact that more than 2 hours were necessary for this analysis when a commercially available soft gel, "Sephadex", was used, it will readily be understood that the analysis time can remarkably be shortened by the use of the gel of the present invention.

EXAMPLE 2

A liquid mixture of 80 g of divinyl adipate (having a purity of 99%), 160 g of n-heptanol and 1 g of 2,2'-azobisisobutyronitrile was polymerized in the same manner as described in Example 1, and the obtained grains were subjected to ester exchange reaction in the same manner as described in Example 1. From the results of infrared absorption spectrum analysis of the ester-exchanged grains and also from the fact that specific surface area of the grains in the dry state was 85 m²/g, it was found that the grains were totally porous polyvinyl alcohol grains. The polyvinyl alcohol grains were reacted with epichlorohydrin in the same manner as described in Example 1, and after the reaction, the classification was carried out to obtain a gel for aqueous GPC. The gel was characterized by having a $\overline{D}_W$ value of 14.0 μm, a $W_R$ value of 1.8 g/g, a $q_{OH}$ value of 7.5 meq/g and a specific surface area of 35 m²/g in the dry state.

In the same manner as described in Example 1, the gels were packed in a column, and an aqueous solution of dextrans or polyethylene glycols was analyzed. It was found that the substance having a higher molecular weight was first eluted. By the dextrans used (maximum molecular weight=about 2,000,000), the Mlim value could not precisely be determined, but it was estimated that the Mlim value would be about $10^7$. The measurement was carried out at a flow rate of 1 ml/min. Analysis of each of the substances was completed within 20 minutes.

EXAMPLE 3

Polyvinyl alcohol grains were obtained by carrying out the suspension polymerization and ester exchange reaction under the same conditions as adopted in Example 1. The grains were charged in a round-bottom flask having a capacity of 2 liters together with a liquid mixture of 141 g of propylene glycol diglycidyl ether, 20 g of sodium hydroxide and 500 ml of acetone, and reaction was carried out for 40 hours under reflux. After the reaction, the grains were put into a 1 N aqueous solution of sulfuric acid and heated at 80° C. under agitation. Then, the grains were washed and classified to obtain an aqueous gel characterized by having a $\overline{D}_w$ value of 18.5 μm, a $W_R$ value of 1.47 g/g, a $q_{OH}$ value of 11.0 meq/g and a specific surface area of 21 m²/g in the dry state.

In a column packed with the gels, a liquid could be passed at a flow rate of 1 ml/min. However, since the pressure was high at this flow rate, analysis was carried out at a flow rate of 0.5 ml/min. From the results of the analysis of an aqueous solution of dextrans and polyethylene glycols, it was found that the Mlim value of the gel was $8 \times 10^4$. The time required for analysis of each of the substances was shorter than 40 minutes.

EXAMPLE 4

In the same manner as described in Example 1, a liquid mixture of 60 g of divinyl adipate, 20 g of diallyl phthalate, 160 g of n-butyl acetate and 1 g of benzoyl peroxide was polymerized and the obtained grains were subjected to ester exchange reaction. The ester-exchanged grains had a specific surface area of 155 m²/g in the dry state, and from the results of infrared absorption spectrum analysis, it was confirmed that the grains had no ester group in the skeleton.

Gels for aqueous GPC were obtained by reacting the grains with epichlorohydrin in the same manner as described in Example 1. The gel was characterized by having a $\overline{D}_w$ value of 14.1 μm, a $W_R$ value of 1.8 g/g, a $q_{OH}$ value of 7.5 meq/g and a specific surface area of 65 m²/g in the dry state.

An aqueous solution of dextrans or polyethylene glycols was analyzed at a flow rate of 1 ml/min by using a column packed with the so obtained gels. The Mlim value was $5 \times 10^4$, and the time required for analysis of each of the substances was shorter than 20 minutes.

Comparative Example 1

A gel was synthesized by cross-linking polyvinyl alcohol in the dissolved state with epichlorohydrin and compared with the gel of the present invention.

In 140 ml of water was dissolved 20 g of polyvinyl alcohol (having a polymerization degree of about 500), and 60 ml of a 5N aqueous solution of sodium hydroxide was then added. The mixture was stirred to form a homogeneous liquid. The liquid mixture was charged in a round-bottom flask together with 500 ml of kerosene containing NOIGEN ET80 (manufactured by Dai-ichi Kogyo Seiyaku K.K., Japan) as an oil-soluble surface active agent, and the mixture was stirred to form a dispersion. Then, 20 ml (23.5 g) of epichlorohydrin was added to the dispersion and the mixture was sufficiently stirred. Then, the reaction was carried out at 50° C. for 16 hours and subsequently at 70° C. for 4 hours. After completion of the reaction, the reaction mixture was transferred into a beaker having a capacity of 2 liters, and acetone was added to the reaction mixture and the mixture was allowed to stand still. The solvent was removed by decantation. Then, acetone was further added and decantation was conducted again. Then, the gel was put into a water-ethanol liquid mixture containing 2N sodium hydroxide, and the mixture was stirred for 15 minutes. The liquid was then neutralized with diluted hydrochloric acid and the gel was recovered by filtration. The gel was sufficiently washed with ethanol and dried. The obtained gel was characterized by having a $D_w$ value of 30 μm, a $W_R$ value of 9.6 g/g, a specific surface area of 0.2 m²/g in the dry state and a $q_{OH}$ value of 16.1 meq/g. The gel was packed in a stainless steel column of 7.5 mm in diameter and 50 cm in length, and an aqueous solution of dextrans or polyethylene glycols was analyzed. When a high pressure pump was used for the supply of the liquid, the pressure loss in the packed layer was very great and the liquid was not passed. Accordingly, any pump was not used, but the liquid was passed through the column by utilizing the pressure difference of the liquid level. Therefore, about 7 hours were required for the analysis of a sample mixture of dextrans and polyethylene glycols.

EXAMPLE 5

Substantially the same polymerization procedures as described in Example 1 were repeated except that divinyl sebacate was used in place of divinyl adipate. The grains so obtained was subjected to ester exchange reaction. The ester-exchanged grains had a specific surface area of 127 m²/g in the dry state. From the specific surface area and the results of infrared absorption spectrum analysis, it was confirmed that the grains obtained by the ester exchange reaction were of totally porous polyvinyl alcohol.

The polyvinyl alcohol grains were charged in a 2 liters flask together with 55 g of ethylene glycol diglycidyl ether and 1,200 ml of 1,2-dichloroethane, and 1.0 g of boron trifluoride ethyl etherate was then add while stirring. The mixture was heated under agitation at 70° C. for 20 hours. After completion of the reaction, the grains were washed and classified to obtain an aqueous gel characterized by having a $\overline{D}_w$ value of 18.5 μm, a $W_R$ value of 1.82 g/g, a $q_{OH}$ value of 7.2 meg/g and a specific surface area of 42 m²/g in the dry state.

What is claimed is:

1. A totally porous, hydrophilic packing material for chromatography which comprises grains of a hydroxyl group-containing nonionic and hydrophilic synthetic cross-linked polymer having as a main skeleton a chemical structure including carbon atoms, hydrogen atoms and oxygen atoms bonded through single bonds, which atoms are present in the form of hydroxyl groups, ether groups, carbon-hydrogen bonds and carbon-carbon single bonds exclusive of oxygen-oxygen bonds and 3- or 4- membered rings consisting of carbon and oxygen atoms, said synthetic polymer in dry state having a hydroxyl group density of 1 to 15 milliequivalents/g, a specific surface area of 5 to 1000 $m^2/g$ and a water regain of 0.3 to 3.0 g/g.

2. A packing material according to claim 1, wherein said grains have an average grain diameter of 1 to 2,000 μm.

3. A packing material according to claim 1, wherein said grains have an average grain diameter of 2 to 500 μm.

4. A packing material according to claim 1, wherein said grains have an average grain diameter of 2 to 50 μm.

5. A packing material according to claim 1, wherein said chemical structure including carbon atoms, hydrogen atoms and oxygen atoms bonded through single bonds is present in an amount of 97% or more by weight based on the entire skeleton of said synthetic cross-linked polymer.

6. A packing material according to claim 1, wherein said chemical structure is one obtained by reacting a totally porous, hydroxyl group-containing nonionic polymer having a specific surface area of not more than 1 $m^2/g$ as measured upon drying the polymer which has been immersed or dissolved in water and a hydroxyl group density of 5 to 23 milliequivalents/g with 10 to 600% by weight, based on said totally porous, hydroxyl group-containing nonionic polymer, of a polyfunctional substance capable of reacting with the hydroxyl groups of said polymer while forming cross-linking ether groups, the reaction being effected in such a solvent as will not dissolve or swell polyvinyl alcohol.

7. A packing material according to claim 6, wherein said totally porous, hydroxyl group-containing nonionic polymer includes therein at least vinyl alcohol units and/or allyl alcohol units.

8. A packing material according to claim 6, wherein said totally porous, hydroxyl group-containing nonionic polymer is a linear polymer selected from the group consisting of a polyvinyl alcohol, a polyallyl alcohol and a copolymer of vinyl alcohol with allyl alcohol.

9. A packing material according to claim 6, wherein said totally porous, hydroxyl group-containing nonionic polymer has a chemical structure obtained by saponifying a copolymer of a monomer having at least one carboxylic acid vinyl ester group and/or a monomer having at least one carboxylic acid allyl ester group with 1,4-butanediol divinyl ether, diethylene glycol divinyl ether or diethylene glycol diallyl ether.

10. A packing material according to claim 6, wherein said totally porous, hydroxyl group-containing nonionic polymer is one obtained by suspension-polymerizing a monomer liquid containing 10% by weight or more, based on the total amount of monomer, of at least a dicarboxylic acid divinyl ester to obtain grains and subjecting the resulting grains to ester exchange reaction or saponification in such a solvent as will not dissolve or swell polyvinyl alcohol.

11. A packing material according to claim 6, wherein said polyfunctional substance is a member selected from the group consisting of an epihalohydrin, a compound having at least two epoxy groups, a compound having at least two aldehyde groups and mixtures thereof.

12. A packing material according to claim 11, wherein said epihalohydrin is epichlorohydrin.

13. A packing material according to claim 11, wherein said compound having at least two epoxy groups is a member selected from the group consisting of ethylene glycol diglycidyl ether, propylene glycol diglycidyl ether, trimethylolpropane triglycidyl ether and mixtures thereof.

14. A packing material according to claim 11, wherein said compound having at least two aldehyde groups is a member selected from the group consisting of glyoxal, glutaraldehyde and mixtures thereof.

* * * * *